_United States Patent Office_

3,199,998
Patented Aug. 10, 1965

3,199,998
PROCESS FOR THE PREPARATION OF
EMULSIONS
Carl Boresch and Mathieu Quaedvlieg, Leverkusen, and Walter Wunder, Cologne-Flittard, Germany, assignors to Farbenfabriken Bayer Aktiengesellschaft, Leverkusen, Germany, a German corporation
No Drawing. Filed Nov. 14, 1961, Ser. No. 152,148
Claims priority, application Germany, Nov. 16, 1960, F 32,564; Nov. 8, 1961, F 35,313
4 Claims. (Cl. 106—271)

The present invention relates to emulsions; more particularly it concerns a process for the preparation of emulsions which consists in dissolving a compound A in the substances to be emulsified and a compound B in the homogeneous phase and subsequently dispersing the substances to be emulsified in the homogeneous phase whereby the compounds A and B must fulfil the condition of being able to form adducts at the boundary surface of the resultant heterogeneous system.

To the compounds of the type A belong in the first place compounds of the general formula $$R-X-Y-COOH$$

and to the compounds of the type B in the first place compounds of the general formula

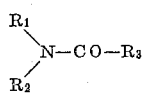

In these formulae denote

R: hydrogen or a hydrocarbon radical

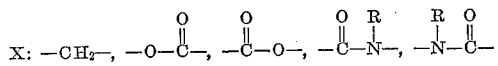

Y: $[CH_2]_{0-18}$ $R_1$: hydrogen or a hydrocarbon radical $R_2$: hydrogen or a hydrocarbon radical $R_3$: hydrogen, a hydrocarbon radical or one of the groups

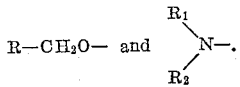

As representatives of compounds of the type A there may be mentioned for example saturated and unsaturated higher fatty acids, montanic acid esters containing free carboxylic groups as well as N-acyl-sarcosien. As representatives of compounds of the type B there may be mentioned for example formamide, dimethyl formamide, acetamide, dimethyl acetamide, carbamic acid methyl ester as well as urea.

Depending on the circumstances, the dissolving of the compounds of the type A or the type B in the substances to be emulsified or in the homogeneous phase can also be carried out with the aid of a solubilizer, such as ethanol, isopropanoyl, benzene or tetrahydronaphthalene.

The process according to the invention enables substances of various types, for example aliphatic and aromatic hydrocarbons such as solid paraffins, chlorinated paraffins, benzines, mineral oils, benzene, chlorinated benzene, toluene and xylene, furthermore waxes and fats such as saturated and unsaturated triglycerides, and also silicones, to be excellently emulsified in, for example, water.

The proportion of compounds A and B to the substances to be emulsified may vary within wide limits, it is, however, advisable to use at least one mol of the compound B per mol of the compound A.

Conventional mechanical devices can be used for the preparation of the emulsions; it is advantageous to employ a turbo mixer.

The emulsions obtained according to the process of the invention possess valuable properties. If the homogeneous phases permits a dissociation, the emulsions are weakly acidic. When water is used as the homogeneous phase the emulsions can be diluted.

It is further noteworthy that the emulsions are salt-free and do not show hydrophilic properties when applied to substrates after drying. Hitherto known emulsions do not possess these characteristics or not to the same extent. The emulsions of the present invention can be applied in many ways. They can be used in all cases where the corresponding emulsions obtainable by hitherto known processes are employed. On account of their neutral or weekly acid reaction they are, for example, especially suitable for cosmetic preparations.

When the process of the present invention is used for the preparation of aqueous emulsions of paraffins, waxes or silicones which are to be applied for hydrophobing fibrous materials, such as textile materials, leather or paper, it is advantageous to add zirconium salts, for instance zirconium oxychloride or acid zirconium acetate, to the emulsions at any stage of their preparation. The emulsions thus obtained exhibit a hydrophobing action which is superior to the hydrophobing action of the aqueous emulsions of paraffins, waxes or silicones hitherto prepare with the addition of zirconium salts.

The aqueous emulsions prepared according to the invention are stable even if zirconium salts are added. This is surprising, for the emulsions of the invention which belong to the anionic type are sensitive towards acids, and the zirconium salts show a strongly acid reaction in aqueous solution.

Suitable proportions of the components to be applied in the performance of the present invention can easily be determined by preliminary tests. Some indications are given in the following examples which serve to illustrate the invention without, however, limiting the scope thereof; the parts indicated are parts by weight.

*Example 1*

30 parts of montanic acid (acid number 140, saponification number 165, M.P. about 80% C.) are dissolved at 85% C. in 80 parts of liquid paraffin DAB VI. The resultant hot solution is introduced while vigorously stirring (8000 r.p.m.) into a solution of 6 parts of urea in 440 parts of water at 85–90° C. The emulsion formed is further vigorously stirred for some time and then cooled while stirring.

Instead of 6 parts of urea there may also be used 5 parts of formamide, 9 parts of dimethyl formamide, 7 parts of acetamide or 10 parts of a carbamic acid methyl ester.

Example 2

30 parts of montanic acid (acid number 140, saponification number 165, M.P. about 80° C.) are dissolved at 85° C. in 80 parts of beef tallow. The resultant hot solution is introduced while vigorously stirring (8000 r.p.m) into a solution of 6 parts of urea in 440 parts of water at 85–90° C. The emulsion formed is further vigorously stirred for some time and then cooled with stirring.

Instead of beef tallow, olive-oil may also be emulsified according to the method described above.

Example 3

30 parts of montanic acid (acid number 140, saponification number 165, M.P. about 80° C.) are dissolved at 85° C. in 100 parts of paraffin (M.P. 52–54° C.). The resultant hot solution is introduced while vigorously stirring (8000 r.p.m.) into a solution of 4.5 parts of urea in 400 parts of water at 85–90° C. The emulsion formed is further vigorously stirred for some time and then cooled with stirring.

Example 4

30 parts of montanic acid (acid number 140, saponification number 165, M.P. about 80° C.) are dissolved at 85° C. in 80 parts of silicone oil. The resultant hot solution is introduced while vigorously stirring (8000 r.p.m.) into a solution of 7 parts of acetamide in 440 parts of water at 85–90° C. The emulsion formed is further vigorously stirred for some time and then cooled with stirring.

Example 5

16 parts of first runnings of coconut oil fatty acid (acid number 354) are dissolved at 85° C. in 80 parts of liquid paraffin DAB VI. The resultant hot solution is introduced while vigorously stirring (8000 r.p.m.) into a solution of 14 parts of urea in 440 parts of water at 85–90° C. The emulsion formed is further vigorously stirred for some time and then cooled with stirring.

Example 6

29 parts of linseed oil fatty acid (acid number 194) are dissolved at 85° C. in 80 parts of olive oil. The resultant hot solution is introduced while vigorously stirring (8000 r.p.m.) into a solution of 8 parts of urea in 440 parts of water at 85–90° C. The emulsion formed is further vigorously stirred for some time and then stirred with cooling.

Example 7

35 parts of the sarcoside prepared from oleic acid chloride and methylaminoacetic acid are dissolved at 85° C. in 80 parts of liquid paraffin DAB VI. The resultant hot solution is introduced while vigorously stirring (8000 r.p.m.) into a solution of 7 parts of acetamide in 440 parts of water at 85–90° C. The emulsion formed is further vigorously stirred for some time and then cooled with stirring.

Example 8

7.3 parts of montanic acid (acid number 140, saponification number 165, M.P. about 80° C.) are dissolved at 85° C. in 14.6 parts of paraffin (M.P. 52–54° C.). The resultant hot solution is introduced while vigorously stirring (8000 r.p.m.) into a solution of 2.8 parts of urea in 43 parts of water at 85–90° C. The emulsion formed is further vigorously stirred until the size of the particles of the paraffin-montanic-acid-mixture in the emulsion is below 2μ. Thereupon the emulsion is introduced while continuously stirring at 95° C. into a solution prepared from 7.3 parts of zirconium oxychloride ($ZrOCl_2 \cdot 8H_2O$) and 18.3 parts of water warmed to 85° C. The stirring is continued until the size of the particles of the paraffin-montanic-acid-mixture in the emulsion which first increases on account of the addition of the zirconium salt again decreases to below 2μ. Finally the emulsion is cooled and mixed with 4 parts of saturated aqueous sodium acetate solution.

Example 9

60 parts of montanic acid (acid number 140, saponification number 165, M.P. about 80° C.) are dissolved at 85° C. in 120 parts of paraffin (M.P. 52–54° C.). The resultant hot solution is introduced while vigorously stirring (8000 r.p.m.) into a solution of 9 parts of urea in 600 parts of water at 85–90° C. The emulsion formed is further vigorously stirred for 20 minutes and then cooled with stirring to 30° C. Thereupon 180 parts of an aqueous solution of zirconyl acetate containing 8.5 percent by weight of $ZrO_2$ are introduced into the emulsion at 30° C.

Example 10

4.9 parts of montanic acid (acid number 140, saponification number 165, M.P. about 80° C.) are dissolved at 85° C. in 9.7 parts of paraffin (M.P. 52–54° C.). The resultant hot solution is introduced while vigorously stirring (8000 r.p.m.) into a solution of 9 parts of urea in 600 parts of water at 85–90° C. The emulsion formed is further vigorously stirred for 20 minutes and then cooled with stirring to 30° C. Thereupon 180 parts of an aqueous solution of zirconyl acetate containing 8.5 percent by weight of $ZrO_2$ are introduced into the emulsion at 30° C.

Example 11

4.9 parts of montanic acid (acid number 140, saponification number 165, M.P. about 80° C.) are dissolved at 85° C. in 9.7 parts of paraffin (M.P. 52–54° C.). The resultant hot solution is introduced while vigorously stirring (8000 r.p.m.) into a solution of 1.8 parts urea in 55.1 parts of water at 85–90° C. The emulsion formed is further vigorously stirred and then mixed with a solution prepared from 5.3 parts of zirconium oxychloride ($ZrOCl_2 \cdot 8H_2O$), 15.8 parts of water and 4 parts of saturated aqueous sodium acetate solution. Finally the emulsion is homogenized.

Example 12

12 parts of montanic acid (acid number 140, saponification number 165, M.P. about 80° C.) are dissolved at room temperature in a solution prepared from 48 parts of hydrogenpolysiloxane, 18 parts of isopropanol and 18 parts of tetrahydronaphthalene. The clear solution obtained is introduced while vigorously stirring (8000 r.p.m.) into a solution of 4.5 parts of urea in 200 parts of water. Thereupon the emulsion is mixed while stirring with 140 parts of a solution prepared from 53 parts of zirconium oxychloride ($ZrOCl_2 \cdot 8H_2O$), 158 parts of water and 74 parts of saturated aqueous sodium acetate solution. The emulsions prepared according to the Examples 8–12 can be used for hydrophobing textile materials for instance in the following manner:

The materials are impregnated in an aqueous bath containing per litre 50–80 g. of the emulsions, then squeezed to an increase of weight of about 60–80 percent and heated to 120–140° C. for 2–4 minutes. Fabrics manufactured from fibres of polymeric ε-caprolactam or fabrics from polyester fibres and cotton thus treated show a water absorption of 5–8 percent after spraying for 10 minutes in the Bundesmann apparatus. If the emulsions are to be applied to fabrics of cotton, it is advisable to add 10 g. of the methylether of trimethylolmelamine per litre of the impregnation bath; the fabrics show then a water absorption of 12%. The resistance to water pressure determined according to the Schopper method amounts to a pressure of 500 mm. water.

We claim:

1. As a new composition of matter, an emulsion prepared by dissolving a compound A in the substance to be emulsified and a compound B in the substance which will form the homogeneous phase of the emulsion and subsequently forming a dispersion from the aforesaid materials, compound A being a member selected from the group consisting of saturated and unsaturated higher fatty acids, montanic acid esters containing free carboxyl groups, and N-acyl-sarcosine, and compound B being a member selected from the group consisting of formamide, dimethyl formamide, acetamide, dimethyl acetamide, methyl carbamate and urea, compounds A and B having the ability to form adducts at the boundary surface of the dispersed phase of the resultant emulsion and being present in a ratio of at least one mol of B per mol of A.

2. The emulsion of claim 1 containing a zirconium salt.

3. The emulsion of claim 1 wherein the substance to be emulsified is selected from the group consisting of solid paraffins, chlorinated paraffins, benzines, mineral oils, benzene, chlorinated benzene, toluene, xylene, waxes, fats and silicones.

4. The emulsion of claim 1 wherein the homogenous phase is water.

References Cited by the Examiner

UNITED STATES PATENTS

| | | | |
|---|---|---|---|
| 1,643,675 | 9/27 | Montgomerie | 252—311.5 |
| 1,952,008 | 3/34 | Bruson | 252—357 XR |
| 2,302,697 | 11/42 | Katzman | 252—357 |
| 2,304,125 | 12/42 | Shutt et al. | 252—49.5 |
| 2,457,853 | 6/49 | Mater | 106—243 |
| 2,737,458 | 3/56 | Burnham | 106—171 |
| 2,759,851 | 8/56 | Fluck et al. | |
| 2,769,724 | 11/56 | Studenic et al. | 117—55 |
| 2,838,422 | 6/58 | Orthner et al. | 106—243 |

OTHER REFERENCES

"Chemical Behavior of Zirconium," Blumenthal, 1958, D. Van Nostrand Co. Inc., N.Y., page 318.

ALEXANDER H. BRODMERKEL, *Primary Examiner.*

JOSEPH REBOLD, MORRIS LIEBMAN, *Examiners.*